Patented Apr. 27, 1937

2,078,910

UNITED STATES PATENT OFFICE 2,078,910

ADHESION OF RUBBER

James A. Merrill, Akron, Ohio, assignor to Wingfoot Corporation, Wilmington, Del., a corporation of Delaware No Drawing. Application September 28, 1934, Serial No. 745,851

3 Claims. (Cl. 154—2)

This invention relates to the adhesion of rubber to base materials. More particularly the invention relates to the treatment of cured rubber with a halogen and the securing of this treated rubber to a base material by a suitable adhesive.

In general, the methods previously suggested for cementing cured rubber to base materials such as metal, wood, glass, etc. have proved unsatisfactory because of the poor bond formed between the rubber and the adhesive employed.

According to this invention the surface of the rubber which is to be bonded to the base is treated with a halogen and the halogen-treated surface is then bonded to the base by a suitable adhesive. Preferably the rubber is first cured to the desired shape and the surface of the cured rubber is then treated with the halogen in order to produce a surface which gives a good bond with the adhesive employed. The rubber may be treated with the halogen before curing and then be united to the base either before or after or during the curing. The adhesive to be employed will depend upon the nature of the base and the conditions under which the assembled product is to be used. For example, if the assembled product is to be used at high temperatures a thermoset adhesive is advantageously used. If the base is glass an adhesive which forms a strong bond with glass is to be employed. Similarly if the base is wood or metal, an adhesive which forms a strong bond with these materials is used. The halogenated rubber surface forms a good bond with any adhesive such as glue, shellac, a thermoplastic rubber derivative, e. g. a condensation derivative of rubber, or resins such as a phenol formaldehyde, styrene, glycerol phthalic anhydride, etc. In general it is preferable to apply the adhesive as a solution, although with certain adhesives, the adhesive may be applied as a thin sheet or a fine powder and then be heated with pressure to secure the desired bond. The adhesive in solution may be applied to either the treated rubber surface or the base or preferably to both. The rubber and base may be pressed together while the adhesive is still tacky or with suitable adhesives, such as solutions of shellac or thermo-setting resins in a volatile solvent, the solvent may be allowed to evaporate and the dried treated surfaces then pressed together with sufficient heat to bind the surfaces together, and in the case of a thermo-setting resin, to set the resin.

The halogen treatment of the rubber may be varied. The cured rubber may, for example, be dipped in chlorine water or bromine water or be exposed to a gaseous halogen so that the whole surface is halogenated, and then the adhesive may be applied to only that part which is to be bonded to the base. As an alternative method only that surface which is to be bonded to the base may be treated with the halogen. If a water solution of the halogen is used the treatment must be prolonged preferably for several hours in order to secure a good bond between the treated rubber surface and the adhesive. For example, four hours treatment in chlorine water gives a very strong union. Treatment for a shorter time, such as two or three hours or a treatment of more than four hours may be used.

Preferably the halogen is applied in a solvent which swells the rubber. For example, 5% solution of bromine in ethylene dichloride can be employed and under such circumstances treatment for only ten seconds is all that is required. Treatment for one minute in a one per cent solution of bromine in ethylene dichloride likewise gives a strong bond. A solution of 5% chlorine in ethylene dichloride will give satisfactory treatment in five minutes. Instead of ethylene dichloride other organic solvents which swell the rubber, such as carbon tetrachloride, chloroform, etc. may be used.

After the treatment of the rubber surface with the halogen the treated surface is washed to remove any reagent which has not entered into the reaction. Alcohol and acetone are most satisfactory for this purpose. If the rubber is to be bonded to metal the surface of the metal is preferably first sand blasted or pickled. Other bases should be thoroughly cleaned before applying the adhesive.

I claim:

1. The method of bonding cured rubber to metal which comprises treating a surface of the rubber with a solution of bromine in a solvent which swells the rubber and then bonding the treated surface of the rubber to the metal by a thermo-setting resin.

2. The method of bonding cured rubber to a base which comprises treating a surface of the rubber with a solution of bromine in ethylene dichloride and then bonding the treated surface of the rubber to the metal by a thermo-setting resin.

3. The method of bonding cured rubber to a base which comprises treating a surface of the rubber with a solution of bromine in a solvent which swells the rubber and then bonding the treated surface of the rubber to the base by a thermo-setting resin.

JAMES A. MERRILL.